US009722794B2

(12) United States Patent
Blair et al.

(10) Patent No.: US 9,722,794 B2
(45) Date of Patent: Aug. 1, 2017

(54) SYSTEM AND METHOD FOR REMOTE ACCESS, REMOTE DIGITAL SIGNATURE

(71) Applicant: IMS Health Incorporated, Danbury, CT (US)

(72) Inventors: Charles Blair, Toronto (CA); Elkin Florez, Richmond Hills (CA); David Annan, Oakville (CA); Ryan Fung, North York (CA); Hussam Mahgoub, Toronto (CA)

(73) Assignee: IMS HEALTH INCORPORATED, Danbury, CT (US)

( * ) Notice: Subject to any disclaimer, the term of this patent is extended or adjusted under 35 U.S.C. 154(b) by 83 days.

(21) Appl. No.: 14/176,963

(22) Filed: Feb. 10, 2014

(65) Prior Publication Data
US 2015/0229477 A1 Aug. 13, 2015

(51) Int. Cl.
*H04L 29/06* (2006.01)
*H04L 9/32* (2006.01)

(52) U.S. Cl.
CPC .......... *H04L 9/3247* (2013.01); *H04L 9/3213* (2013.01); *H04L 9/3228* (2013.01); *H04L 9/3263* (2013.01); *H04L 9/3268* (2013.01); *H04L 63/0823* (2013.01); *H04L 63/126* (2013.01); *H04L 63/0807* (2013.01); *H04L 63/123* (2013.01); *H04L 2209/76* (2013.01)

(58) Field of Classification Search
USPC ................................................ 713/156–159
See application file for complete search history.

(56) References Cited

U.S. PATENT DOCUMENTS 6,105,133 A * 8/2000 Fielder ............... H04L 9/0891
380/283
6,959,382 B1 * 10/2005 Kinnis et al. ............. 713/170
(Continued)

FOREIGN PATENT DOCUMENTS

WO 2014077698 A1 5/2014

OTHER PUBLICATIONS

European Office Action for related European Application No. 15153552.3-1870, dated Jun. 29, 2015, 8 Pages.

*Primary Examiner* — Dede Zecher
*Assistant Examiner* — Vadim Savenkov
(74) *Attorney, Agent, or Firm* — Maldjian Law Group LLC

(57) ABSTRACT

System and method to digitally validate a document, the method including: receiving, by a secure development platform (SDP), a security information from an end user, the SDP comprising an SDP processor coupled to a secure SDP memory; exchanging a security token with a user device based upon the security information; receiving, from the user device, a request for a digital certificate; managing and storing public/private key pairs; transmitting, to the PKI service processor, the request for a digital certificate; if information in the request for a digital certificate is correct: creating the digital certificate; and receiving the digital certificate from the PKI service processor; and storing the digital certificate in the secure SDP memory, the secure SDP memory not directly accessible by the user device, the SDP processor configured to request a signature generation by use of the private key associated with the digital certificate, the SDP processor configured to request a validation by use of the digital certificate.

20 Claims, 6 Drawing Sheets

(56) References Cited

U.S. PATENT DOCUMENTS

| | | | |
|---|---|---|---|
| 7,484,089 B1* | 1/2009 | Kogen | H04L 63/062 |
| | | | 713/156 |
| 7,693,285 B2* | 4/2010 | Curry | 380/281 |
| 7,822,209 B2* | 10/2010 | Fu | H04L 9/0822 |
| | | | 380/281 |
| 8,108,669 B2* | 1/2012 | Saito et al. | 713/156 |
| 8,171,534 B2* | 5/2012 | Chan et al. | 726/9 |
| 8,621,601 B2* | 12/2013 | Yan | G06F 21/12 |
| | | | 380/44 |
| 8,726,342 B1* | 5/2014 | Agarwal | G06F 21/6218 |
| | | | 726/1 |
| 9,129,138 B1* | 9/2015 | Hesselink | G06F 21/78 |
| 2003/0035548 A1* | 2/2003 | Kwan | H04L 63/04 |
| | | | 380/286 |
| 2003/0196090 A1* | 10/2003 | Nagahama | 713/176 |
| 2004/0093493 A1* | 5/2004 | Bisbee et al. | 713/156 |
| 2009/0240936 A1* | 9/2009 | Lambiase et al. | 713/156 |
| 2011/0213966 A1* | 9/2011 | Fu | H04L 63/0807 |
| | | | 713/158 |
| 2011/0293098 A1* | 12/2011 | Fu | H04L 9/0894 |
| | | | 380/286 |
| 2013/0219181 A1 | 8/2013 | Schwarz et al. | |
| 2013/0291070 A1* | 10/2013 | Triantafillou | H04L 63/08 |
| | | | 726/4 |
| 2013/0311772 A1 | 11/2013 | Etheridge | |

\* cited by examiner

100

200

250

300

400

500

600

SYSTEM AND METHOD FOR REMOTE ACCESS, REMOTE DIGITAL SIGNATURE

BACKGROUND

Field of the Invention

Embodiments of the present invention generally relate to digitally signed documents, and, in particular, to a system and method for automated remote credential access and usage in a digital service environment.

Description of Related Art

Mobile health ("mHealth") is a term for medical and public health practice supported by mobile devices, such as mobile phones, patient monitoring devices, personal digital assistants (PDAs), and other wireless devices. mHealth involves the use of voice and short messaging service (SMS) as well as more complex functionalities such as 3G systems, global positioning systems (GPS), and Bluetooth technology.

The advanced computing capability of smartphones that are typically optimized for internet usage means that individuals can access information and advice (including that related to medical care) from anywhere at any time. The smartphones also provide functionality that is not available via a laptop such as an ability to capture information from sensors on the move and the addition of GPS and camera functions.

A mobile application (or mobile app) is a software application designed to run on smartphones, tablet computers and other mobile devices. Some mobile apps are used to deliver health care information to consumers, or to gather and send health status information from a consumer to a health care provider. Not all mobile apps that have been developed in healthcare are widely available to consumers. Some of the most advanced medical apps are not necessarily designed to target general consumers. Some mobile apps have been designed for healthcare practitioners, others are for patients but require a prescription, and others are intended for only a small subset of patients. Some mobile apps require approval by the U.S. Food and Drug Administration (FDA). A mobile app may also be able to execute on other platforms such as a personal computer (PC) if it has been ported to the underlying operating system, e.g., from Android to Windows or iOS. As used herein, the term "mobile app" may include an application that executes on a PC (e.g., desktop, tower, laptop, netbook, etc.) or other general-purpose consumer computing device, without limitation to a mobile device unless mobility provides a stated benefit or unless otherwise clearly restricted by the context of usage.

Certain patient information is protected by law (e.g., Healthcare Information Portability and Accountability Act (HIPAA) in the U.S.) and must be treated in a way that maintains patient privacy. Such information is termed protected health information (PHI). With respect to PHI, it is important that there is both transparency and awareness of how data entered into a mobile app is used, and that patient consent is obtained for use of PHI data. If a healthcare mobile app collects, stores, and/or transmits PHI, it is essential that it does so in full compliance with HIPAA and any other applicable laws or regulations of the country concerned. Any mobile app that is intended to connect to an Electronic Health Record (EHR) or Personal Health Record (PHR), which enables users to send and retrieve patient information between a mobile device and the EHR/PHR, must do so in a secure manner and all stakeholders involved must accept their stewardship role for protecting the PHI data contained within.

Encryption is a standard tool for ensuring the privacy of communications. A variety of encryption schemes are commercially available to secure protected information, for example the Advanced Encryption Standard (AES), promulgated by the National Institute of Standards and Technology (NIST) as Federal Information Processing Standards Publication 197, Nov. 26, 2001. AES is a symmetric encryption scheme, such that a same cipher key is used for both encoding and decoding. The AES scheme itself exists in multiple variations, such as AES counter mode, AES cipher block chaining (CBC)+cipher text stealing (CTS), RSA, and so forth. Some variations of AES may be described in Request for Comment (RFC) 3962, "Advanced Encryption Standard (AES) Encryption for Kerberos 5," February 2005, and references cited therein.

A conventional written signature is a human-generated indicia that may be used to indicate authenticity of a document, or to indicate agreement with statements within the document. A digital signature is a mathematical scheme for demonstrating the authenticity of a digital message or document. A valid digital signature gives a recipient reason to believe that a known sender created the message, such that the sender cannot deny having sent the message (i.e., ensure authentication and non-repudiation) and that the message was not altered in transit (i.e., ensure integrity). Digital signatures are commonly used for software distribution, financial transactions, and in other cases where it is important to detect forgery or tampering. Creation and usage of digital signatures commonly involves encryption.

Integral to digital signature and/or encryption is the management of public and private encryption keys. A digital certificate is an electronic document that uses a digital signature to bind a public key with an identity, e.g., a name of a person or an organization, their address, and so forth. The certificate can be used to verify that a public key belongs to an individual. Public-key infrastructure (PKI) is a set of hardware, software, people, policies, and procedures needed to create, manage, distribute, use, store, and revoke digital certificates. PKI is known in the art, e.g., as described in U.S. Pat. No. 5,864,667 to Barkan.

PKI binds a public key with a respective user identity by means of a certificate authority (CA). The user identity must be unique within each CA domain. A third-party validation authority (VA) can provide this information on behalf of CA. The binding is established through the registration and issuance process, which, depending on the assurance level of the binding, may be carried out by software at a CA or under human supervision. The PKI role that assures this binding is called the registration authority (RA), which ensures that the public key is bound to the individual to whom it is assigned in a way that ensures non-repudiation.

A drawback to usage PKI services in a disperse environment with mobile apps is that there are many hurdles required for the utilization of PKI services. Mobile app users ordinarily must have some technical knowledge or security knowledge to get started. Mobile app users need to have some knowledge about managing asymmetric keys (e.g., public and private keys), securely storing keys, and securely changing keys locally. Mobile app users usually have a difficult time with the PKI process, e.g., how to start and what to do. Mobile app users ordinarily are not security experts but they are asked to manage PKI credentials or keys. Some mobile app users may be managing PKI credentials and certificate requests for multiple devices, and may find it difficult to keep track of the status of the various devices and their PKI credentials.

Known solutions have addressed PKI management and processes in a manual manner, such that users have to created a PKI key-pair manually and then manage them manually. This is very demanding for mobile app users who usually are not well versed in such procedures. If the PKI key-pair is not managed properly, security may be compromised.

Other known solutions have employed secure elements such as smart cards, Common Access Cards (CACs), and specially configured devices that are used to securely house end-users' PKI credentials. For such solutions, the user must carry additional devices and cards to utilize PKI services. The present commercial practice also includes online services, products and toolkits for developers and end-users to manage PKI credentials and services. In these cases, a manual process for PKI management is still used.

Therefore, what is needed is a more automated process of PKI management without the drawbacks of using additional devices.

SUMMARY

In one embodiment, a method to digitally validate a document may include: receiving, by a secure development platform (SDP), a security information from an end-user, the SDP comprising an SDP processor coupled to a secure SDP memory; exchanging a security token with a user device based upon the security information; receiving, from the user device, a request for a digital certificate; generating the user PKI key-pair and storing it in the SDP secure key store, transmitting, to the PKI service processor, a request for a digital certificate; if information in the request for a digital certificate is correct: creating the digital certificate; receiving the digital certificate from the PKI service processor; and storing the digital certificate in the secure SDP memory, the secure SDP memory not directly accessible by the user device, the SDP processor configured to request a validation by use of the digital certificate.

In some embodiments, the method may further include: receiving, from the user device, a document to digitally sign; transmitting, to the PKI service processor, a request to validate a digital certificate related to the user device; receiving, from the PKI service processor, an indication of validity of the digital certificate; and if the indication indicates a valid digital certificate, digitally signing the document based upon the digital certificate.

In some embodiments, the method may further include: receiving, from the user device, a document to validate and the digital certificate; providing, to the PKI service processor, the digital certificate; receiving, from the PKI service processor, an indication of validity of the digital certificate; and if the indication indicates a valid digital certificate, providing an indication of validity of the document to the user device.

In one embodiment, a system to digitally validate a document may include: a secure development platform (SDP), the SDP comprising an SDP processor coupled to a secure SDP memory and to a receiver, the receiver configured to receive a security information from an end-user; a communication interface configured: to exchange a security token with a user device based upon the security information; and to receive, from the user device, a request for a digital certificate; a transmitter configured to transmit, to the PKI service processor, a request for a digital certificate; and a receiver configured to receive the digital certificate from the PKI service processor; wherein the digital certificate stored in the secure SDP memory is not directly accessible by the user device.

In some embodiments, the system may further include: a transmitter configured to transmit a digital certificate and a document to validate, wherein the digital certificate is validated by the PKI service processor; and a receiver configured to receive from the PKI service processor an indication of validity of the digital certificate, wherein the SDP provides the indication of validity to the user device.

In some embodiments, the system may further include: a transmitter configured to transmit to the PKI service processor a digital certificate to validate; and a receiver configured to receive from the PKI service processor an indication of validity of the digital certificate, wherein the SDP digitally signs the document based upon the indication of validity.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
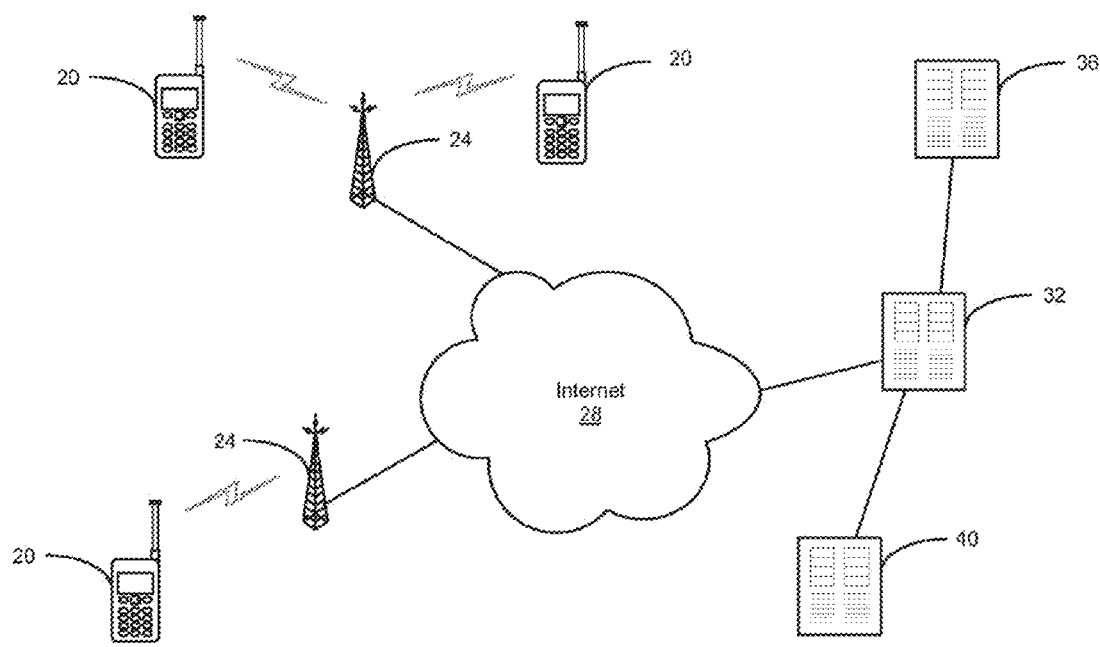
FIG. 1 is a block diagram depicting a mobile communication network in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary digital information system. Although well suited for use with, e.g., a system using a server(s) and/or database(s), the disclosure is not limited to use with any particular type of system or configuration of system elements. Those skilled in the art will recognize that the disclosed techniques may be used in any system or process in which it is desirable to provide a transferable permission to access information or control a decision.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Embodiments in accordance with the present disclosure may provide a digital process and/or system to facilitate information security.

Embodiments in accordance with the present disclosure improve upon the known art by performing PKI initiation operations, key management operations, X.509 certificate management and usage management operations within a secure domain of a secure mobile application development platform. Using such a secure development platform, users can request the creation and storage of asymmetric keys within the secure development platform. Users are able to utilize PKI operations, including signing and validating health or PHI data. The secure development platform may include a secure mobile container with a secure data store. The secure development platform allows a software developer to develop software applications in a secure environment. The secure environment may include freedom from external threats as well as access to sensitive information such as PHI data, PKI operations, digital certificates, and so forth. Later, after a software application is completed and published for use, the secure development platform may allow end users to use the software application, without needing to manage information security, through management of public/private key pairs and other credentials, and so forth. The secure development platform operates by protecting data and access to data at an application level of a networking stack.

The secure mobile data store may be accessed by a user upon user PIN authentication. The secure mobile data store is protected by a derived symmetric key which is derived from a number of factors including the user PIN. The secure development platform may include integrated security for dual-authentication and encryption of content and data per session. A symmetric key used for data encryption is changed per session, thereby helping to ensure a secure transfer of data between the IMS secure server and mobile devices.

The secure development platform may create unique credentials for each user, such that each user is bound to a specific PKI key-pair (e.g., public and private keys). The PKI key-pair is managed by the secure development platform independently per user. One advantage of the secure development platform is that unique credentials are provided per user, thereby reducing a chance of unauthorized usage. Another advantage is that data encryption keys or symmetric keys are session based (i.e., ephemeral). Session-based keys reduce the chance that a key may be broken during the time that the key still is being used. Another advantage is that dual-authentication-encrypted sessions are used, thereby protecting sessions even if one key is compromised. Another advantage is that secure data storage is provided in a mobile container and server container, thereby isolating the secure data storage from other processes running on the mobile terminal or the secure development platform, and helping to enable an easy-to-use PKI system. The secure development platform may provide integrated PKI as an additional service relating to PHI data security management.

The secure development platform may centrally manage the PKI credentials and services for users. Users will not have to be PKI experts, security experts or technical experts to use PKI processes. Security is integrated and the user is not required to be a security expert, nor required to manage PKI components.

Embodiments in accordance with the present disclosure may use a security token and one-time password (OTP) system in order to simplify a user's PKI usage. The user does not need any specific or detailed PKI knowledge in order to manage their PKI usage. No PKI protocols need to be implemented on a user's mobile device.

Embodiments in accordance with the present disclosure use an automated PKI process, and provide automated management of PKI key-pairs (public/private key pairs). The usage and automated management may include key generation, management, storage and/or usage of PKI key-pairs on the server side, thus freeing the user from much of this burden. If a user's mobile device needs to be replaced (e.g., because of a lost device or device upgraded), then the process of replacing that device is simplified without a need to manage PKI key-pairs on the mobile device or other supported computing device.

Embodiments in accordance with the present disclosure enable a user at a mobile device to remotely and securely access PKI key-pair operations performed by the secure development platform. For example, embodiments allow the mobile device to delegate PKI operations to the secure development platform, so that the secure development platform acts in the function of a remote server (i.e., a publisher of public PKI key-pairs for the mobile platform). Furthermore, embodiments may support digital signatures generation, and validation, so that trusted documents may be exchanged between the mobile platform and the secure development platform or other remote computing platforms.

Embodiments in accordance with the present disclosure provide expanded PKI services for health and other applications. Such embodiments may be useful to exchange PHI or other protected information with users or generators of such information, such as Automate Blue Button Initiative (ABBI) (i.e., a system that allows patients to view online and download their own personal health records), the U.S. Government (e.g., Veterans Administration (VA), Department of Defense (DoD), Department of Health and Human Service (HHS), financial firms (e.g., banks, brokerage), etc.).

Embodiments in accordance with the present disclosure provide universal support for substantially any user device of sufficient capabilities, such as mobile platforms, desktop personal computers, and so forth. Embodiments are not tied to the proprietary architecture of a single, closed device. By such universal support, embodiments provide bring-your-own-device (BYOD) support, such that a mobile device user may continue to use their existing mobile device when practicing embodiments in accordance with the present disclosure.

Embodiments in accordance with the present disclosure provide and achieve the aforementioned advantages at least in part by moving PKI operations from a user's mobile device to a secure development platform credential/key server. Hosting the credential operations on the credential server provides several advantages. First, usage of the credential server allows for making it easier for users to perform operations such as key generation, signing, encryption, and so forth.

Another advantage of using a credential server is that the credential server may provide a secure and robust storage facility for private keys at the server rather than on the device. All private keys will be secured and locked using a multi-pass key that is not necessarily stored, but instead may be derived from different sources. This may provide improved security against malicious attacks, compared to dispersed storage of private keys on users' mobile devices. The cost of professionally-managed security of the credential server may be spread among all mobile users, thus potentially reducing the cost to individual users.

Another advantage of using a credential server is that the credential server may provide better quality public/private key pair generation, by use of a higher quality random number generator, e.g., a random number generator that has been validated according to the Federal Information Processing Standard (FIPS) Publication 140-2, (FIPS PUB 140-2), "Security Requirements for Cryptographic Modules", issued May 25, 2001. A random number is often used as a seed value to initialize a cryptographic function or operation. Therefore, a seed value that is more uniformly random in a statistical sense will be harder to guess and thus it will be harder to predict the entire random number generator sequence.

Another advantage of using a credential server is that the credential server may provide a better quality secure store on the server, e.g., a hardware security module (HSM) or other dedicated and/or hardware-based apparatus to provide data security.

Another advantage of using a credential server is that the credential server may provide a token restoration service, from the credential server to a mobile device under certain conditions. For example, the token restoration service may be used if and when a user loses his or her mobile device, or if the user purchases a new mobile device, and so forth. By storing credentials on the credential server rather than on the mobile device, the private key may be associated with the user rather than to the user's mobile device. Without this token restoration service, if a user were to lose or change his or her device, the private key would be lost and the certificate would have to be added to a certificate revocation list (CRL). The CRL is a list of certificates (or a list of serial numbers of certificates) that have been revoked, and therefore, an entity presenting a revoked certificate should no longer be trusted. Conventionally, if a user were to lose or replace their mobile device, a new public/private key-pair must be generated, and new certificates that depend upon the pubic key must be produced and distributed.

Another advantage of using a credential server is that the credential server may provide a bilateral (i.e., two-way) authenticated and encrypted communication channel for all transactions between the device and the server using a one-time password (OTP).

Another advantage of using a credential server is that the credential server may provide PKI services to users who may be using a broad variety of remote devices and mobile devices (e.g., devices compatible with Java 2 Micro Edition (J2ME), BlackBerry, Android, Apple, etc.)/PC/embedded processors, and so forth, enabled with OTP capability. OTP capability may be used to provide primary user authentication for a PKI enrollment and registration process.

Embodiments in accordance with the present disclosure provide remote access to PKI processes using a mobile app, by use of a digital token and OTP access scheme. Doing so helps ensure that only an authorized end-user has access to their private PKI information. A sync protocol may be used to provide mutual authentication and end-to-end message encryption. The digital token and/or OTP technology may be used to derive a unique encryption key for a user, in order to manage user PKI credentials. Embodiments may also provide a secure entry point for PKI processes when a user is using a mobile app program.

FIG. 1 illustrates a system for accessing, validating and digitally signing sensitive information in accordance with an embodiment of the invention. The embodiments described herein relate to a system for generating and using a digital PKI (or digital certificate based upon a PKI) between two parties: in this case, a mobile device user and a credential server in a trusted domain. The mobile phone has sufficient communication capability to connect to the credential server for management of the access to sensitive information such as PHI.

A number of mobile devices 20 are shown in communication wirelessly with cellular base stations 24 via cellular communications. The cellular base stations 24 enable communications over a large, public network, such as the Internet 28, via a number of intermediate servers operated by one or more cellular communications carriers (not shown). FIG. 1 further illustrates a number of non-mobile computing devices 21 in communicative contact with Internet 28. A transaction server 32 may also be in communication with the Internet 28. The transaction server 32 may also be in communication with a validation server 36 over a private network. Additionally, the transaction server 32 may be in communication with one or more repositories of sensitive information such as a financial institution 40 where the users of the mobile devices 20 and/or non-mobile computing devices 21 may have a relationship of some sort, such as business or health care.

Embodiments in accordance with the present disclosure are not limited to the types of mobile devices 20 and/or non-mobile computing devices 21 illustrated in FIG. 1. Embodiments may be used with substantially any type of input/output device or terminal including PCs, MacBooks, tablet computer, thin clients, or substantially any other type of computing device accessible via a network.

It should be emphasized the configuration of the elements as shown in FIG. 1 is for purposes of illustration only and should not be construed as limiting embodiments of the present invention to any particular arrangement of elements.

The server may be a software-controlled system including a processing unit (CPU), microprocessor, or other type of digital data processor executing software or an Application-Specific Integrated Circuit (ASIC) as well as various portions or combinations of such elements. The memory may comprise random access memory (RAM), a read-only memory (ROM), or combinations of these and other types of electronic memory devices. Embodiments of the present invention may be implemented as software, hardware (such as, but not limited to, a logic circuit), or a combination thereof.

Figure 2A:
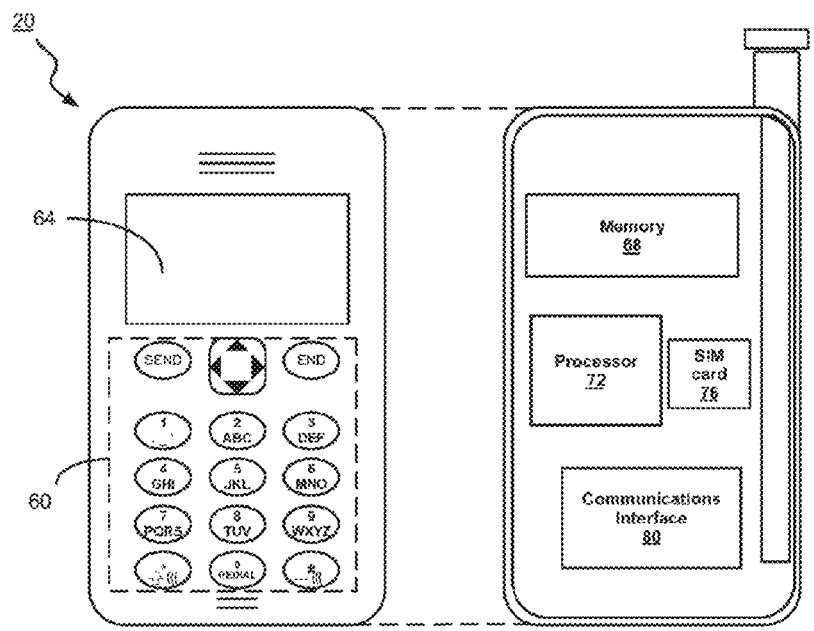
FIG. 2A is a system level block diagram system level block diagram depicting a mobile device in accordance with an embodiment of the present invention.

Referring to FIG. 2A, a number of components of the mobile device 20 are shown. As illustrated, in this embodiment, the mobile device 20 is a typical mobile phone having basic functions. The mobile device 20 has an input interface 60 for receiving input from a user, and a display 64 is provided for presenting information visually to the user. The mobile device 20 also includes memory 68 for storing an operating system that controls the main functionality of the mobile device 20, along with a number of applications that are run on the mobile device 20, and data. A processor 72 executes the operating system and applications. A SIM card 76 provides additional memory for storing applications and data, and has a microprocessor for executing them. Additionally, the SIM card 76 has a unique hardware identification code that permits identification of the mobile device 20. When installed, the SIM card 76 forms part of the mobile device 20. Other types of mobile devices can have encrypted device memory in place of the SIM card 76, which offers the equivalent functionality. A communications interface 80 permits communications with a cellular network for voice and data.

Figure 2B:
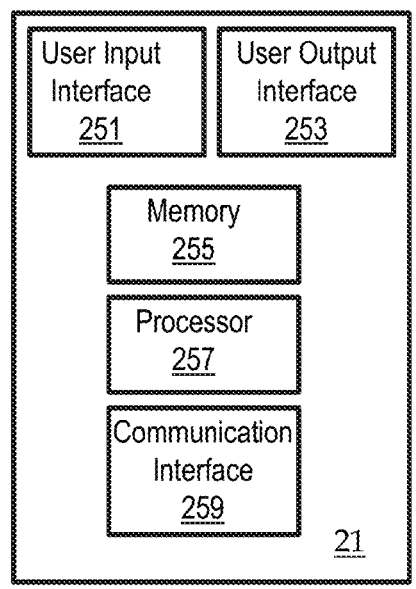
FIG. 2B is a system level block diagram depicting an end-user non-mobile device in accordance with an embodiment of the present invention.

Referring to FIG. 2B, a number of components of non-mobile computing device 21 are shown. As illustrated, in this embodiment, non-mobile device 21 is a typical desktop or tower computer having basic functions. Non-mobile device 21 has a user input interface 251 for receiving input from a user (e.g., a keyboard, touchscreen and/or microphone), and a user output interface 253 is provided for presenting information visually or audibly to the user. Non-mobile device 21 also includes memory 255 for storing an operating system that controls the main functionality of non-mobile device 21, along with a number of applications that are run on non-mobile device 21, and data. A processor 257 executes the operating system and applications. Non-mobile device 21 may have a unique hardware identification code that permits identification of non-mobile device 21 (e.g., a medium access control (MAC) address). At least a portion of memory 255 may be encrypted. A communications interface 259 permits communications with a LAN or Internet 28, e.g., by way of an Ethernet or Wi-Fi interface.

Figure 3:
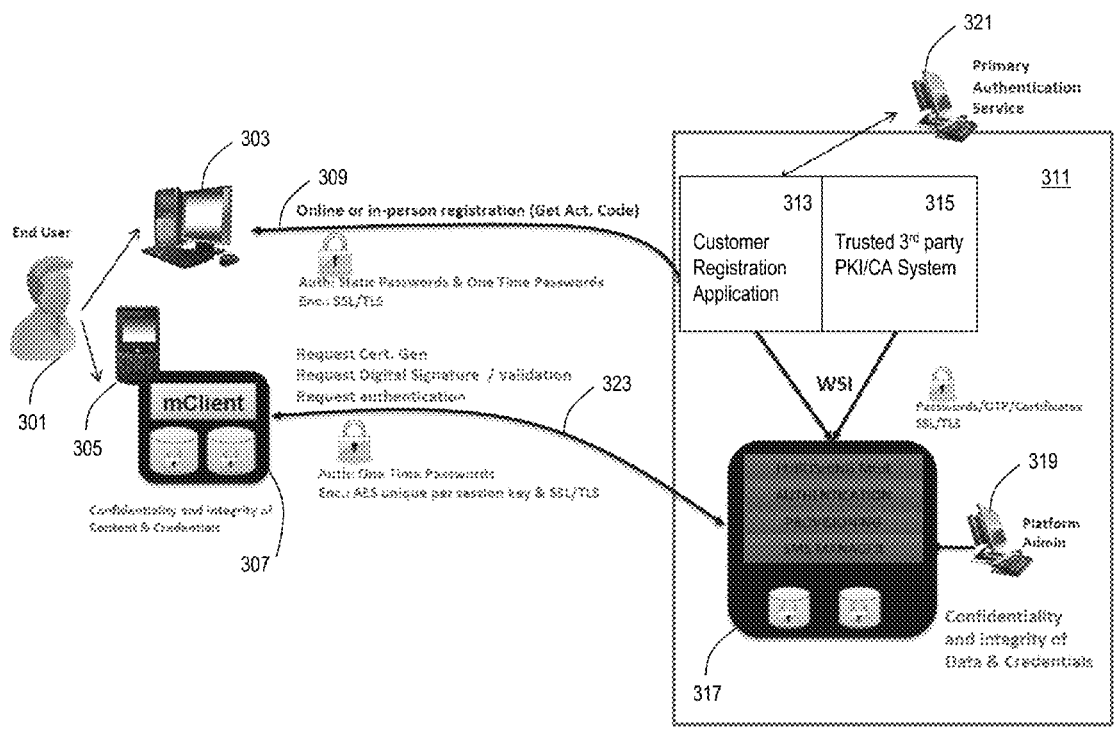
FIG. 3 is a block diagram depicting a system and method to support PKI and digital certificates in accordance with an embodiment of the present invention.

FIG. 3 illustrates at a high level of abstraction an embodiment 300 of a system and process in accordance with the present disclosure. Embodiment 300 may be useful when managing public/private key-pairs and digital certificates that include public keys, in order to provide a PKI support architecture and method for using the same. Embodiment 300 includes a machine interface to end-user 301. The machine interface may include a conventional fixed-location computer (or terminal) 303 and/or a mobile device 305. Mobile devices 20 and/or non-mobile computing devices 21 illustrated in FIG. 1 may be usable as terminal 303 and/or mobile device 305. Mobile device 305, if present, may include a mobile app 307 such as a secure mobile container app. The secure mobile container app, if present, may further include or be in communication contact with one or more secured data stores in order to provide confidentiality and integrity of sensitive information stored within it, and provide protection of end-user credentials used by embodiment 300.

Embodiment 300 may operate in a client/server manner, in which fixed terminal 303 and/or mobile device 305 may be used as a PKI client, in order to interface with security service server 311. Security service server 311 may include one or more server-side applications, such as customer registration application 313, credential server application/secure development platform (SDP) 317 (also referred to as credential server 317 or SDP 317) and/or trusted third-party PKI/CA application 315. One or more of the server-side applications may be in communication contact with primary authentication service 321, which may be located either as part of security service server 311 or external to security service server 311. Certificate validation server 36 (see FIG. 1) may be usable as security service server 311.

The server-side applications may interface with a secure development platform/credential server (SDP) 317, which is adapted to execute one or more server-level services such as a publishing manager, an authentication module, a provisioning module, a secure messaging service (SMS) manager module, and so forth. SDP 317 may provide a secure development platform (i.e., secure from unauthorized intrusion) for the development of mHealth applications. SDP 317 may further provide a secure usage platform such that end users of mHealth applications may use such applications securely and without a need to manage PKI information, digital certificates, and the like. Sensitive information such as passwords, one-time passwords, certificates, secure sockets layer (SSL) information, and/or transmission level security (TLS) information may be stored in a secure memory accessible to SDP 317. Secure development platform 317 may further include or be in communication contact with one or more secured data stores in order to provide confidentiality and integrity of sensitive information stored within it, and provide protection of credentials used by security service server 311. Secure development platform/credential server 317 may operate as a gatekeeper or data access controller to sensitive information. An administrator interface 319 may be provided in order to allow an administrator to configure and otherwise administer SDP 317.

In operation of embodiment 300, end user 301 may begin by attempting to initially log into the system by use of one of the machine interfaces such as conventional fixed-location computer (or terminal) 303 and a secure link. Terminal 303 and security service server 311 may exchange credentials such as registration information, account codes, passwords (including OTP), and security information to support SSL/TLS, and so forth.

Next, customer registration application 313 may receive registration requests from terminal 303. Customer registration application 313 may then interface with other server-side applications and/or server-level services executing on secure development platform/credential server 317 in order to manage user registration requests, return specific user activation codes and request primary authentication for each user in order to confirm their identity. Customer registration application 313 may use this information to register valid users with secure development platform 317.

Next, at some later point in time, end user 301 may attempt to access confidential information through mobile app 307 such as a secure mobile container app. Mobile app may transmit to security service server 311 a request that a digital certificate be generated, a request for a digital signature or validation of a digital signature, a request for authentication, or similar messages. Security service server 311 may respond with sufficient security information and/or authorizations in order for the secure mobile container application to process requests from end user 301. The information from security service server 311 may include one-time passwords, a secure authenticated session, SSL information, TLS information, and so forth.

Figure 4:
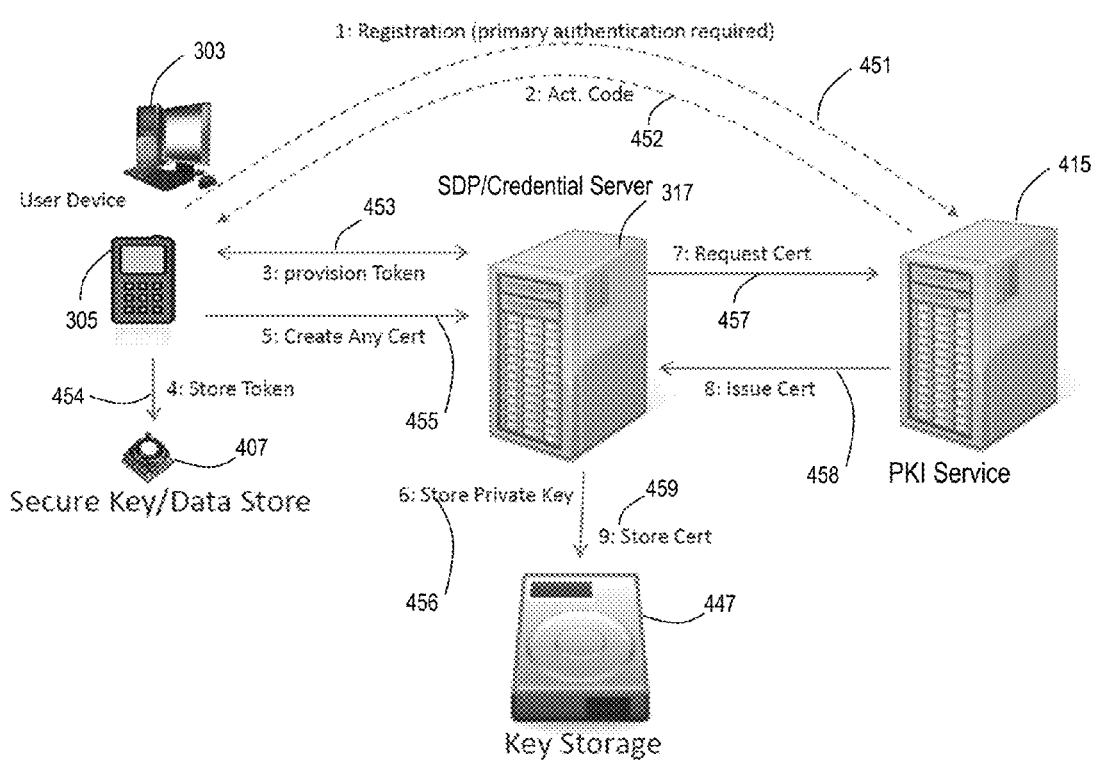
FIG. 4 is a block diagram depicting a system and method to create a digital certificate in accordance with an embodiment of the present invention.

FIG. 4 illustrates at a high level of abstraction an embodiment 400 of a system and process in accordance with the present disclosure, similar to but at a different level of abstraction as embodiment 300 of FIG. 3. Embodiment 400 may be useful when managing public/private key-pairs and digital certificates that include a public keys. Like-numbered elements may also be illustrated in FIG. 3. Embodiment 400 includes a user device 303 in communicative contact with PKI service 415. PKI service 415 acts as a registrar to generate and validate digital certificates. PKI service 415 may include the functionality of one or more server-side applications, such as customer registration application 313 and/or trusted third-party PKI/CA application 315. In some embodiments, PKI service 415 may be logically integrated with secure development platform 317, whereas in other embodiments PKI service 415 may be physically remote from but in communicative contact with secure development platform 317. Communicative contact may be via a network (not illustrated in FIG. 4) such as Internet 28 (see FIG. 1) or a LAN. Embodiment 400 may further include another user device 305 (which may or may not be the same as user device 303). User device 305 may be in communicative contact with secure development platform 317 and security data store 407. Secure development platform 317 may be in communicative contact with key storage 447. Key storage is a protected memory that is used to store sensitive information. Key storage may use techniques known in the art to store sensitive information, such as encrypting stored data, usage of access control such as a firewall, and so forth. Key storage 447 may be physically separate from secure development platform 317 but in communicative contact. Alternatively, at least a portion of key storage 447 may be implemented as at least a portion of a memory within secure development platform 317.

Key storage 447 provides a memory that is accessible to secure development platform 317 but is not directly accessible by user device 305 and PKI service 415. For example, by being not directly accessible to user device 305 and PKI service 415, key storage 447 is not a part of user device 305 and PKI service 415, is not managed by user device 305 and PKI service 415, and is not accessed by a process running on user device 305 and PKI service 415. However, if user device 305 needs to use information stored in key storage 447, then processes running on another device such as secure development platform 317 may access key storage 447 to carry out the request for user device 305 and communicate the results back to user device 305.

A process in accordance with embodiment 400 to create a digital certificate may first include user device 303 transmitting message 451 to PKI service 415. Message 451 may include registration information relevant to the user of user device 303 and/or user device 305. The registration information of message 451 may be used to initially set up PKI service 415 to be able to manage PKI and certificate information for user device 303 and/or user device 305.

Next, PKI service 415 may send back a message 452 to user device 303 and/or user device 305 that includes an activation code message, which confirms to user device 303 and/or user device 305 that SDP 317 is enabled to manage PKI key-pairs and certificates for user device 303 and/or user device 305. For ease of reference, user device 303 and/or user device 305 hereinafter will be collectively referred to as user device 305, unless a distinction is clearly intended between user device 303 and user device 305.

Next, user device 305 and secure development platform 317 may engage in a message exchange 453 that includes a request from user device 305 for a provision token. In response, the provision token is generated by secure development platform 317 and sent back to user device 305. The provision token and credentials are received by user device 305 and in turn is sent via message 454 to secure key data store 407 for storage. Secure key data store 407 may include a protected memory, and may be implemented as a portion of memory within user device 305.

Next, at some later point in time, user device 305 sends message 455 to secure development platform 317 in order to create a digital certificate and corresponding PKI key-pair (public/private key pair). Secure development platform 317 will create the public/private key pair and in turn generate message 457 to request a generation of a digital certificate. Message 457 is sent to PKI service 415. At about the same time, secure development platform 317 may generate message 456 and send message 456 to key storage 447 in order to store the private key of the PKI key-pair for user device 305.

After PKI service 415 receives message 457 from secure development platform 317, PKI service 415 may create the digital certificate using the information within message 457. If the information is valid, then PKI service 415 will generate a digital certificate with the public key in the message 457. The digital certificate is sent by PKI service 415 to secure development platform 317 by use of message 458. The received certificate is then sent by use of message 459 to key storage 447 in order to be securely stored for future use by secure development platform 317.

Upon the conclusion of the message exchange of embodiment 400 described above, the digital certificate and private key held by SDP 317 is ready for use by user device 305. For example, a health-related mobile app running on user device 305 is now able to access, sign and/or validate sensitive information by use of the private key and digital certificate.

Figure 5:
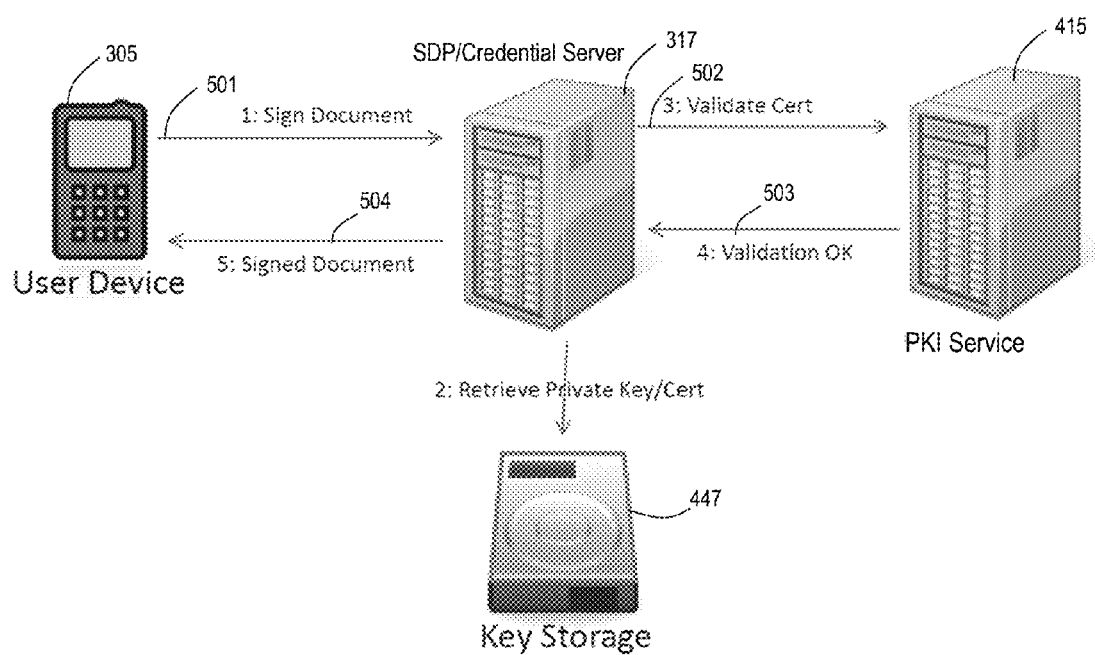
FIG. 5 is a block diagram depicting a system and method to sign a document with a digital certificate in accordance with an embodiment of the present invention.

FIG. 5 illustrates at a high level of abstraction an embodiment 500 of a system and process in accordance with the present disclosure. Embodiment 500 may be useful in a secure, PKI support architecture in order to sign a document securely by use of private key digital certificates. Like-numbered elements may also be illustrated in FIGS. 3-4.

Embodiment 500 includes a user device 305 that is communicatively coupled to a secure development platform 317. Secure development platform 317 in turn is communicatively coupled to a PKI service 415 and to a key storage 447. As with embodiment 400, key storage 447 may be physically separate from secure development platform 317 but in communicative contact. Alternatively, at least a portion of key storage 447 may be implemented as at least a portion of a memory within secure development platform 317.

A process in accordance with embodiment 500 may first include user device 305 transmitting message 501 to secure development platform 317. Message 501 may include a document to be digitally signed, along with a request to have it signed.

Next, secure development platform 317 may send message 502 to PKI service 415. Message 502 includes a request to validate a digital certificate pertaining to user device 305 and/or the user of user device 305, and may include the digital certificate sought to be validated.

Next, after PKI service 415 has been able to determine whether or not the digital certificate is valid, PKI service 415 may send a message 503 to secure development platform 317 with an indication of whether or not the digital certificate is valid.

Next, if the digital certificate was found to be valid, then secure development platform 317 may send message 504 to user device 305 in order to provide a signed document to user device 305, the document being digitally signed by a digital certificate private key associated with user device 305 or the user of user device 305 in the secure key store 447. At any point during practice of the embodiment illustrated in FIG. 5, secure development platform 317 may interface with key storage 447 in order to read/write data needed by secure development platform 317 to digitally sign the document.

Figure 6:
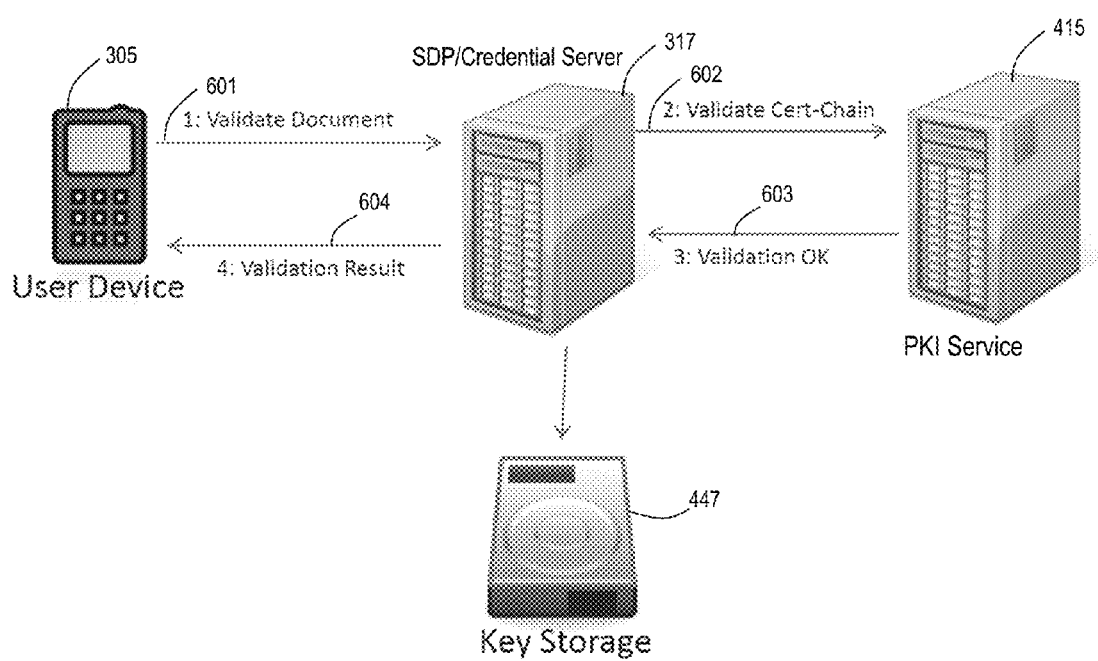
FIG. 6 is a block diagram depicting a system and method to validate a signed document by use of a digital certificate in accordance with an embodiment of the present invention.

FIG. 6 illustrates at a high level of abstraction an embodiment 600 of a system and process in accordance with the present disclosure. Embodiment 600 may be useful in a secure, PKI support architecture in order to validate a document signature by use of the public key distributed in the digital certificate. Like-numbered elements may also be illustrated in FIGS. 3-5.

Embodiment 600 includes a user device 305 that is communicatively coupled to a secure development platform 317. Secure development platform 317 in turn is communicatively coupled to a PKI service 415 and to a key storage 447. As with embodiment 400, key storage 447 may be physically separate from secure development platform 317 but in communicative contact. Alternatively, at least a portion of key storage 447 may be implemented as at least a portion of a memory within secure development platform 317.

A process in accordance with embodiment 600 may first include user device 305 transmitting message 601 to secure development platform 317. Message 601 may include a request to validate a document. In some embodiments, message 601 may include the document itself. In other embodiments, message 601 may include a characteristic of the document sought to be validated, the characteristic being sufficient to determine, along with security and/or certificate information maintained by embodiment 600, whether or not the document is valid.

Next, secure development platform 317 may send message 602 to PKI service 415. Message 602 includes a request to validate the digital certificate and certificate chain.

Next, after PKI service 415 has been able to determine whether or not the digital certificate is valid, PKI service 415 may send a message 603 to secure development platform 317 with an indication of whether or not the digital certificate is valid. Secure development platform 317 uses this information along with the digital certificate public key and any other information that may be needed to validate the document received from the user device 305.

Next, secure development platform 317 may send message 604 to user device 305 in order to provide a validation result to user device 305. If the document is valid, then user device 305 and the user thereof is allowed access to, and control over the document. If the document is not valid, then user device 305 and the user thereof is not allowed access to, nor control over the document.

At any point during practice of the embodiment illustrated in FIG. 6, secure development platform 317 may interface with key storage 447 in order to read/write data needed by secure development platform 317.

Embodiments of the present invention include a system having one or more processing units coupled to one or more memories. The one or more memories may be configured to store software that, when executed by the one or more processing unit, allows practice of embodiments described herein, including at least in FIGS. 3-4 and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to provide confidential information for use in secure application development, comprising:
   receiving, by a secure development platform (SDP), a security information from an end-user, the SDP comprising an SDP processor;
   exchanging a security token with a user device based upon the security information;
   receiving, from the user device, a request for a digital certificate;
   transmitting, to a PKI service processor, the request for a digital certificate;
   if information in the request for a digital certificate is correct: creating the digital certificate; and receiving the digital certificate from the PKI service processor;
   storing the digital certificate in a secure memory not accessible to the user device, wherein the SDP processor is configured to request a validation by use of the digital certificate; and
   retrieving, by the SDP, confidential data from the secure memory and transmitting the confidential data to the user device, to develop applications using the confidential data.

2. The method of claim 1, further comprising:
   receiving, from the user device, a document to digitally sign;
   transmitting, to the PKI service processor, a request to validate a digital certificate related to the user device;
   receiving, from the PKI service processor, an indication of validity of the digital certificate; and
   if the indication indicates a valid digital certificate:
      digitally signing the document based upon the digital certificate private key generated by SDP per user; and
      providing the signed document to an end-user.

3. The method of claim 1, further comprising:
   receiving, from the user device, a document to sign and the digital certificate;
   providing, to the PKI service processor, the digital certificate;
   receiving, from the PKI service processor, an indication of validity of the digital certificate; and
   if the indication indicates a valid digital certificate, providing an indication of validity of the document to the user device.

4. The method of claim 1, wherein the validation comprises usage of a symmetric key used for data transfer that is changed per session.

5. The method of claim 1, wherein the digital certificate is not managed by an end user.

6. The method of claim 1, wherein the SDP is configured to manage PKI credentials and services for an end user.

7. The method of claim 1, wherein the validation comprises usage of a dual authentication process.

8. The method of claim 1, wherein the SDP is configured to use a multi-pass symmetric key that is derived from more than one source.

9. The method of claim 1, further comprising restoring the security token to the user device.

10. The method of claim 1, wherein the SDP is configured to provide a bilateral authenticated and encrypted channel.

11. A system to provide confidential data for use in secure application development, comprising:
   a secure development platform (SDP), the SDP comprising an SDP processor coupled to a receiver, the receiver configured to receive a security information from an end user;
   a communication interface configured: to exchange a security token with a user device based upon the security information; and to receive, from the user device, a request for a digital certificate;
   a transmitter configured to transmit, to a PKI service processor, the request for a digital certificate; and
   a receiver configured to receive the digital certificate from the PKI service processor if information in the request for a digital certificate matches information in the digital certificate request,
   wherein the digital certificate is stored in a secure memory that is not accessible by the user device, and
   wherein the SDP further retrieves confidential data from the secure memory and transmits the confidential data to the user device, to develop applications-using the confidential data.

12. The system of claim 11, further comprising:
   a transmitter configured to transmit to the PKI service processor a digital certificate to validate; and
   a receiver configured to receive from the PKI service processor an indication of validity of the digital certificate,
   wherein the SDP digitally signs the document based upon the indication of validity and PKI key-pair generated and stored by SDP.

13. The system of claim 11, further comprising:
   a transmitter configured to transmit a digital certificate and a document to validate, wherein the digital certificate is validated by the PKI service processor; and
   a receiver configured to receive from the PKI service processor an indication of validity of the digital certificate,
   wherein the SDP validate the document and provides the indication of validity to the user device.

14. The system of claim 11, wherein the validation comprises usage of a symmetric key used for data transfer that is changed per session.

15. The system of claim 11, wherein the digital certificate is not managed by an end user.

16. The system of claim 11, wherein the SDP is configured to manage PKI credentials and services for an end user.

17. The system of claim 11, wherein the validation comprises usage of a dual authentication process.

18. The system of claim 11, wherein the SDP is configured to use a multi-pass symmetric key that is derived from more than one source.

19. The system of claim 11, further comprising a communication interface configured to restore the security token to the user device.

20. The system of claim 11, wherein the SDP is configured to provide a bilateral authenticated and encrypted channel.

* * * * *

UNITED STATES PATENT AND TRADEMARK OFFICE
CERTIFICATE OF CORRECTION

| | | |
|---|---|---|
| PATENT NO. | : 9,722,794 B2 | Page 1 of 1 |
| APPLICATION NO. | : 14/176963 | |
| DATED | : August 1, 2017 | |
| INVENTOR(S) | : Blair et al. | |

It is certified that error appears in the above-identified patent and that said Letters Patent is hereby corrected as shown below:

On the Title Page

Column 2, in "Primary Examiner", Line 1, delete "Dede" and insert -- Cordelia --, therefor.

On Page 2, Item (56), Column 1, under "U.S. Patent Documents", Line 12, after "21/78" insert -- 1/1 --.

In the Specification

In Column 15, Line 22, delete "of" multiples of" and insert -- of multiples of" --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*